United States Patent [19]

Horiguchi

[11] Patent Number: 5,311,498
[45] Date of Patent: May 10, 1994

[54] RECORDING AND REPRODUCING APPARATUS PROVIDED IN EACH DATA BLOCK WITH A SECRET INFORMATION NUMBER

[75] Inventor: Toshio Horiguchi, Hachioji, Japan
[73] Assignee: Olympus Optical Co., Ltd., Tokyo, Japan
[21] Appl. No.: 811,466
[22] Filed: Feb. 26, 1992

[30] Foreign Application Priority Data

Feb. 28, 1991 [JP] Japan .................. 3-034439

[51] Int. Cl.$^5$ .............. G11B 7/007; G11B 20/12
[52] U.S. Cl. ................... 369/275.1; 369/275.3; 369/47; 380/23
[58] Field of Search ............ 369/275.1, 275.3, 47, 369/58; 428/64, 65; 430/311, 945; 380/23

[56] References Cited

U.S. PATENT DOCUMENTS

| | | | |
|---|---|---|---|
| 4,979,159 | 12/1990 | Tsuruoka et al. | 369/58 |
| 5,070,490 | 12/1991 | Endo | 369/275.3 |
| 5,113,061 | 5/1992 | Tanaka | 369/275.3 |
| 5,164,577 | 11/1992 | Horie | 369/275.3 |
| 5,226,026 | 7/1993 | Oshiba | 369/48 |

FOREIGN PATENT DOCUMENTS 62-192978  8/1987  Japan .
1-286176  11/1989  Japan .

Primary Examiner—Paul M. Dzierzynski
Assistant Examiner—Kim-Kwok Chu
Attorney, Agent, or Firm—Armstrong, Westerman, Hattori, McLeland & Naughton

[57] ABSTRACT

An optical card apparatus including a recording device for recording in each of a plurality of data blocks in a card-like recording medium user data to be recorded along with data protecting information inhibiting the user data from being carelessly read out, and a reproducing device for reproducing the user data and data protecting information recorded in the recording medium. A data transfer controlling device for permitting the user data to be read out only in case the input secret information data coincide with the data protecting information recorded in the recording medium in the case of reproducing the user data with this reproducing device.

19 Claims, 11 Drawing Sheets

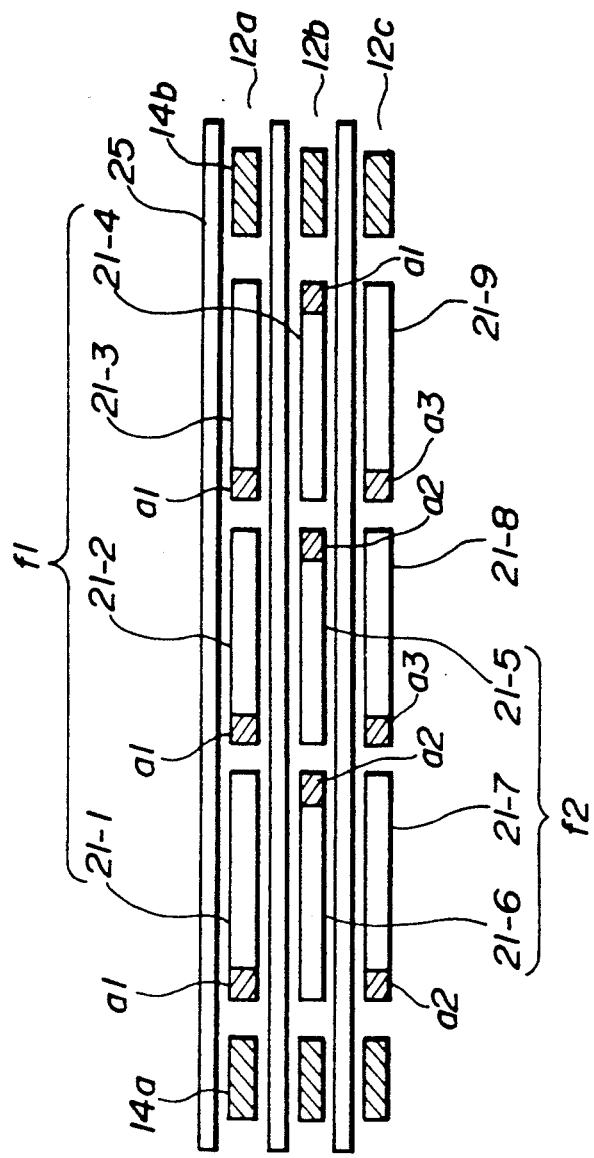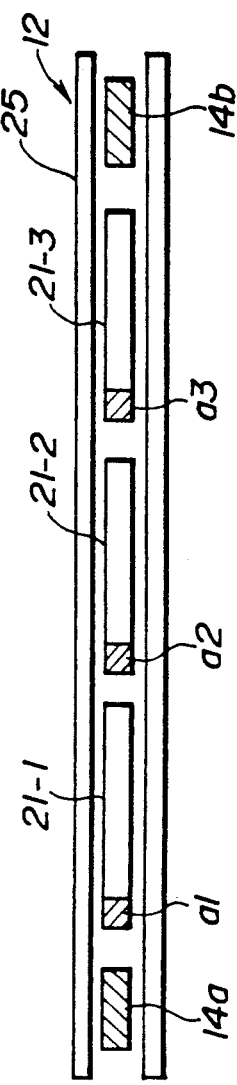

RECORDING AND REPRODUCING APPARATUS PROVIDED IN EACH DATA BLOCK WITH A SECRET INFORMATION NUMBER

BACKGROUND OF THE INVENTION

1. Field of the Invention and Related Art Statement

This invention relates to a recording and reproducing apparatus provided in each data block such as a sector with a secret information number as a data protecting means for inhibiting information recorded in such optical recording medium as an optical card from being read out.

Among information recording and reproducing apparatus for recording and/or reproducing information in an information recording medium are such magnetic recording medium as a floppy disc or magnetic card and such optical recording medium as an optical disc or optical card. Optical discs and optical cards are optical recording media. They can not be re-written but are so large in the memorizing capacity as to be considered to have a wide application range for the optical discs to record image information or to preserve writings and for the optical cards as bank deposit pass-books, portable maps or prepaid cards used for shopping or the like.

Particularly, the optical card is so portable as to be considered to be used to record such personal private information as individual health controlling information. Therefore, countermeasures of protecting information peculiar to an individual from being seen by others are being investigated by encoding the information. In the publications of Japanese Patent Applications Laid Open Nos. 286176/1989 and 192978/1988 is disclosed a method wherein data other than the inherent information are recorded as additional information in a part within a sector of an optical card or photomagnetic disc.

In the publication of Japanese Patent Application Laid Open No. 192978/1988, additional information is added to each data block so that errors may be corrected in the line direction and column direction to improve the error correcting function.

Also, in the publication of Japanese Patent Application Laid Open No. 286176/1989, a track number is added to each sector and an error correcting code is added to the sector number in recording them so that the track number and sector number may be read out at a probability higher than in ordinary data.

In the method wherein the information to be kept secret relating to an individual is encoded and recorded so as to be decoded when it is to be reproduced, there are problems that such hard formation as a logical circuit of encoding/decoding the information will be required and the cost will be high. In case it is not of a hard formation, a soft formation will be made by the program by using a microcomputer or the like controlling the recording and reproducing apparatus, the process will take time and the access time will be likely to increase.

In the publications of Japanese Patent Applications Laid Open Nos. 286176/1989 and 192978/1988, the example of recording the track number, sector number and disc discriminating information is only disclosed but nothing is mentioned of the protection of the information.

By the way, in the now extensively prevalent cash card, a secret information number is input in using the card. Such secret information number is not to protect the information mentioned in the card but is to identify whether the person using the card is the owner of the card so that only the owner of the card may have access to the card. Therefore, when even a third person can input the secret information number, he will be able to unjustly have access to the card and will be likely to cause a great damage to the owner of the card.

SUMMARY OF THE INVENTION

An object of the present invention is to provide an apparatus for recording and reproducing such optical recording medium as an optical card which can secure the protection of such information desired to be kept secret as individual information without increasing the cost and access time.

Another object of the present invention is to provide an apparatus for recording and reproducing such an optical recording medium which can secure the protection of such information desired to be kept secret as individual information with a simple formation.

An optical card recording and reproducing apparatus according to the present invention comprises a recording means for recording user data to be recorded in an optical card used as a recording medium and secret information data for inhibiting said user data from being carelessly read out, a reproducing means reproducing said user data and secret information data recorded in said recording medium by said recording means and a data reading out/displaying/transferring controlling means permitting said recorded user data to be read out/displayed/transferred only in case the secret information data reproduced from said recording medium by said reproducing means corresponds to the secret information data input when reproduced so that the user data may be positively protected by a simple formation without increasing the cost and access time.

BRIEF DESCRIPTION OF THE DRAWINGS

FIG. 1 is a conceptional formation diagram of the first embodiment of the present invention.

FIG. 2 is an explanatory view of an optical card used in the first embodiment.

FIG. 3 is a general formation diagram of an optical card recording and reproducing apparatus.

FIG. 4 is an explanatory view showing as magnified a part of tracks of an optical card.

FIG. 5 is an explanatory view showing as magnified one sector of FIG. 3.

FIG. 6 is a block diagram showing the formation of a main part of the first embodiment.

FIG. 7 is a flow chart showing the operation contents at the time of recording in the first embodiment.

FIG. 8 is a flow chart showing the operation contents at the time of reproduction in the first embodiment.

FIGS. 9a,9b and 10a,10b are explanatory views showing data formats recorded in tracks of a modification of the first embodiment.

DETAILED DESCRIPTION OF THE PREFERRED EMBODIMENTS

The present invention shall be concretely explained in the following with reference to the drawings.

Figure 1:
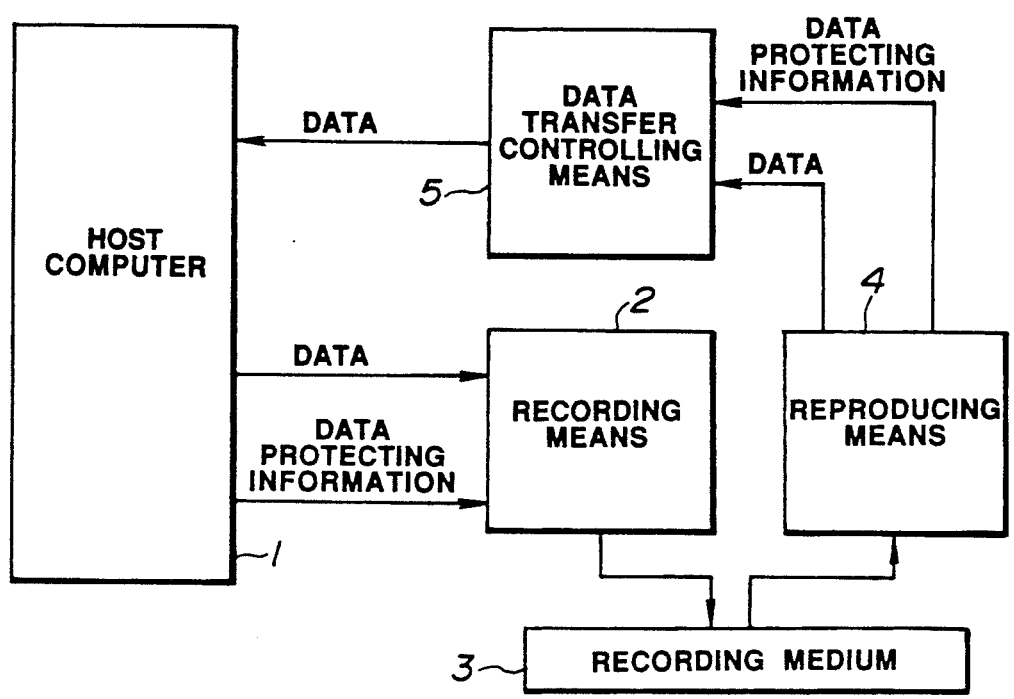
FIGS. 1 to 8 relate to the first embodiment of the present invention.

The scheme of the first embodiment of the present invention is shown in FIG. 1. In recording, a host computer 1 transmits user data and the user data protecting information protecting the user data, which inhibits the reading of the user data, to a recording means 2. This recording means 2 records the above mentioned user data and data protecting information in a recording medium 3. The user data and data protecting information recorded in this recording medium 3 are reproduced by a reproducing means 4. The reproduced user data and reproduced data protecting information are transferred to a data transfer controlling means 5. This data transfer controlling means 5 judges whether the above mentioned reproduced data protecting information corresponds to input data protect information which is input whenever the above mentioned data protecting information is reproduced, will transfer the reproduced user data to the host computer 1 in case the above mentioned reproduced data protecting information is judged to correspond to the input data protecting information but will inhibit transferring them to the host computer and will protect the user data from being read out in case the above mentioned reproduced data protecting information is not judged to correspond to the input data protecting information.

The first embodiment shall be concretely explained in the following with reference to FIG. 2 and the others following it.

Figure 2:
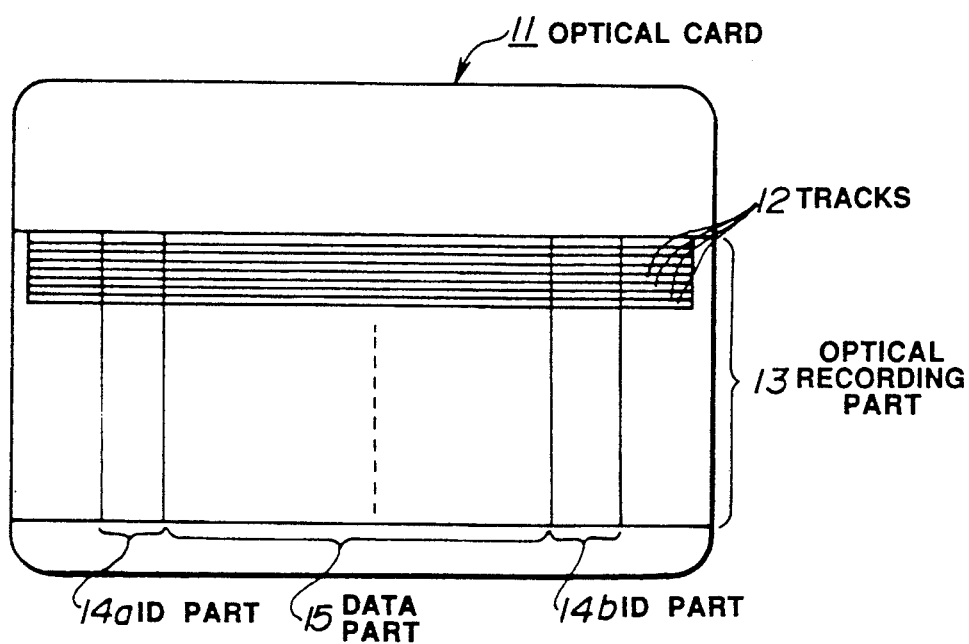
Figure 3:
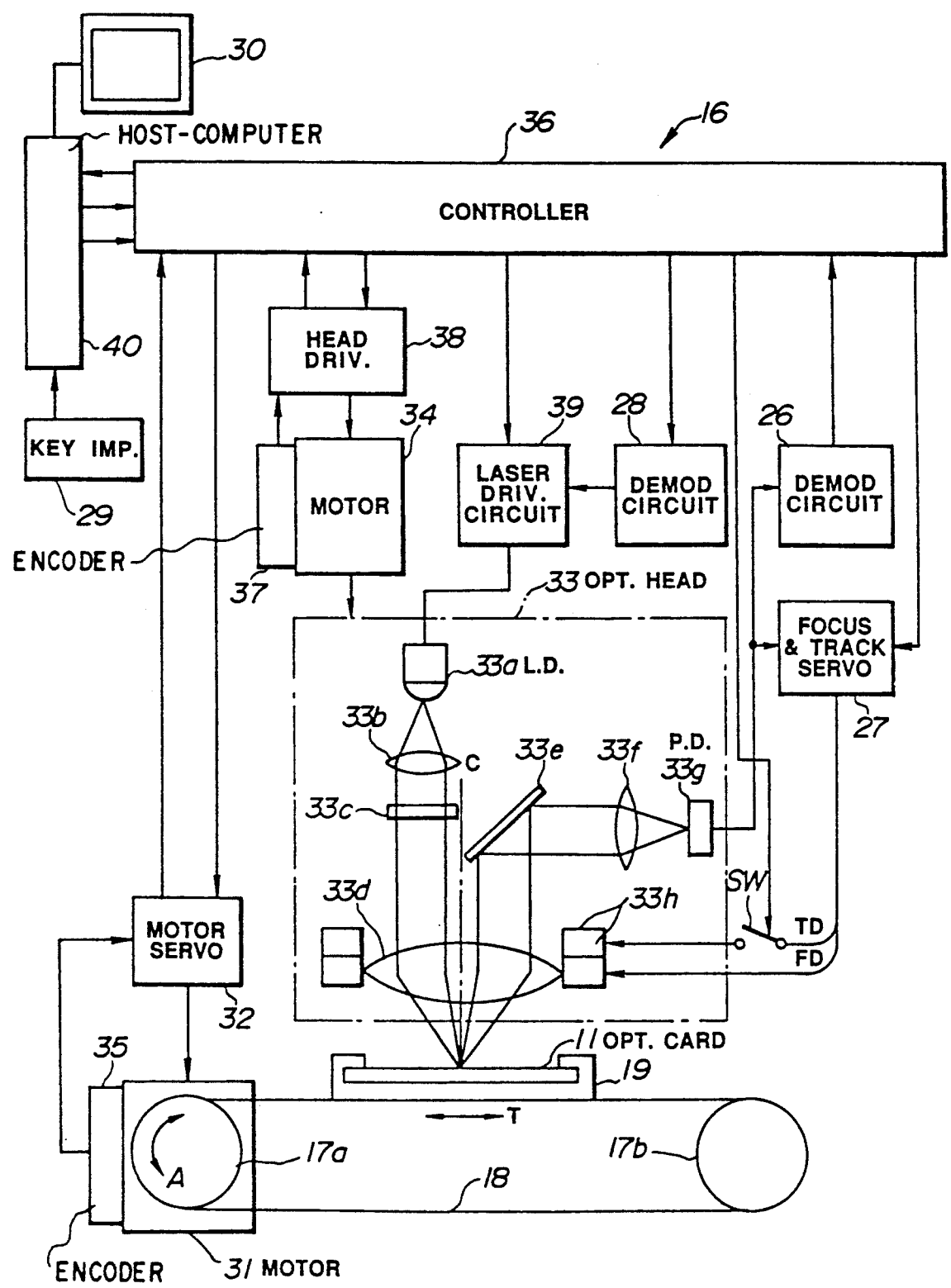

FIG. 2 shows an optical card 11 to be used in the first embodiment. The optical card 11 is provided in both end parts of an optical recording part 13 having a plurality of tracks 12 parallel with each other with ID parts 14a and 14b recording track information corresponding to the respective tracks and has a data part 15 between these ID parts 14a and 14b. The ID parts 14a and 14b are prerecorded in advance in making the optical card 11. FIG. 3 shows the general formation of an optical card recording/reproducing apparatus.

As shown in FIG. 3, in an optical card recording/reproducing apparatus 16 of the first embodiment, such optical card 11 as is shown, for example, in FIG. 2 can be fitted to a shuttle 19 provided in a predetermined position on a conveyer belt 18 hung between pulleys 17a and 17b. This conveyer belt 18 is moved by a motor 31 forming an optical card conveying means. This motor 31 is fed with a driving signal by a motor servo circuit 32 and can rotate and drive a pulley 17a fitted to a rotary shaft of this motor 31 clockwise and counterclockwise by this driving signal.

By the rotation of this pulley 17a, the optical card 11 is reciprocated and conveyed in a direction (track direction) T parallel with the tracks. An optical head 33 is arranged opposite this optical card 11 and is moved in a direction (which is vertical to the paper surface in FIG. 3 and is mentioned also as a track crossing direction) crossing the tracks by a motor 34 as a head moving means.

By the way, in this embodiment, the optical card 11 is moved in the track direction T but it is apparent that, instead of it, the optical head 33 may be moved in the track direction T and the optical card 11 may be moved in the track crossing direction.

To the above mentioned motor 31 is connected a rotary encoder 35 for detecting the relative position of the shuttle 19 in the track direction T with respect to the optical head 33 of the shuttle 19 so that one pulse of this rotary encoder 35 may correspond, for example, to a relative displacement of 50 μm of the shuttle 19 with respect to the optical head 33 of the shuttle 19. The above mentioned motor servo circuit 32 is connected to the motor 31, rotary encoder 35 and a controller 36 and a controlling instruction prepared in response to such position information as the pulse signal output from the above mentioned rotary encoder 35 is transmitted to the motor servo circuit 32 from the controller 36 to control the motor 31 in order that the conveying speed may be a fixed speed between the ID parts 14a and 14b in FIG. 2 of the optical card 11.

A rotary encoder 37 for detecting the position in the track crossing direction of the optical card 11 is connected to the motor 34 moving the above mentioned optical head 33 the same as to the motor 31. One pulse of this rotary encoder 37 corresponds to the relative displacement, for example, of 50 μm in the direction intersecting at right angles with the tracks of the optical head 33 with respect to the optical card 11.

Also, the above mentioned motor 34 and rotary encoder 37 are connected to the controller 36 through an optical head driving circuit 38. A controlling instruction prepared on the basis of the position information or the like from the above mentioned rotary encoder 37 is transmitted to the optical head driving circuit 38 from the controller 36 so that, as a result, the rotation of the motor 34 may be controlled and the optical head 33 may be set near the position opposed to the objective track.

That is to say, by moving the optical head 33 in the track crossing direction under the control by the controller 36, access to any track (strictly speaking, rough access, that is, access near to the objective track) can be set.

For example, in the case of recording or reproduction with access to an objective track different from the present track from which the optical head 33 is reading out data, the controller 36 will calculate the distance of the movement from the track difference between the present track and the objective track, that is, from the number of tracks to be crossed and will drive the motor 34 through the optical head driving circuit 38 to move for this distance.

The controller 36 counts the pulses output from the rotary encoder 37. When the number of pulses corresponding to the above mentioned distance is detected, the motor 34 will be stopped and, as a result, the optical head 33 will stop.

After this rough access, the controller 36 sets the optical head 33 in the tracking state, relative to the optical card 11 is moved, the track address information of the ID part 14a or 14b is read out, it is judged whether this read track address information coincides with the track address information of the objective track or not and, in case it is judged to coincide, it will be recognized to have access to the objective track but, in case it does not coincide, the controller 36 will control the optical head 33 or objective lens 33d to be moved in the track crossing direction again toward the objective track and, when this operation is repeated, access to the objective track will be able to be made anyhow.

The optical system of the above mentioned optical head 33 is here of a formation corresponding to a focus error signal detecting method called "an axis deviating method" wherein a light beam radiated from a laser diode 33a connected to the controller 36 through a laser driving circuit 30 outputting a laser driving signal is made parallel beams by a collimating lens 33b and the parallel beams are divided into a 0'th dimension beam and two positive and negative 1'th order beams totaling three beams by a diffraction grating 33. The divided three beams are incident with the center of the beams upon a position displaced from the optical axis C of the objective lens 33d.

The three beams condensed by the objective lens 33d form three minute beam spots on the signal recording surface of the optical card 11. Two positive and negative primary (±1'th order) sub-beam spots are radiated to be along the lengthwise direction of the track 12 while slightly crossing the guide tracks 25 and 26 provided respectively on both side surface parts of the track 12. The central main non-diffracted (0'th order) beam spot scans the central part of the track 12 and is used for recording or reproduction.

The reflected beams from the optical card 11 again pass through the objective lens 33d, have the direction changed by 90 degrees by a mirror 33e and are made to form an image on a photodetector 33g by an image forming lens 33f.

The above mentioned photodetector 33g is formed of a plurality of detectors and comprises a focus error signal detecting device (an addition output is used to reproduce a recorded signal) consisting of a light receiving device divided into two parts in the center and tracking error signal detecting photodetecting devices provided on both sides of it.

The output of the added sum of the outputs of the light receiving device divided into two parts on the central side of the above mentioned photodetector 33g is fed to a demodulating circuit 26 by which a reading signal is produced. Also, the output of the focus error signal detecting device and tracking error signal detecting photodetecting device of the above mentioned photodetector 33g is fed also to a focus & track servo circuit 27.

A focus error signal and tracking error signal are produced by such process as a subtraction from the outputs of the photodetector 33g by this focus & track servo circuit 27. These signals are further processed to be compensated in the phase and amplified so as to be a focus driving signal FD and tracking driving signal TD which are then applied to a lens actuator 33h driving the objective lens 33d and the objective lens 33d is driven in the focus and tracking direction through this lens actuator 33h so that the spot formed on the track of the optical card 11 may be always in focus and may follow the track.

By the way, the tracking driving signal TD is applied to the lens actuator 33h through a switch SW which is controlled to be on/off by the controller 36 and is be on in a tracking servo state but is off in such case as in the access operation of moving the optical head 33 in the track crossing direction.

At the time of reproducing data, the controller 36 will control the laser driving circuit 39 to output a low output reading light beam from the laser diode 33a and will control the drive of the motor servo circuit 32, optical head driving circuit 38, focus & track servo circuit 27 and demodulating circuit 26.

At the time of recording data, the controller 36 will end the control of the access to the objective track on which the recording is made in the optical card 11 the same as at the time of reproducing and then will control the laser driving circuit 39 to output a high output recording light beam from the laser diode 33a. Therefore, by the modulated data modulated by the modulating circuit 28 on the basis of the data after the data to be recorded are processed to be encoded by an EDAC (Error Detection and Correction) circuit 41 (See FIG. 6), a high output pulse-like driving current and low output pulse-like driving current are fed to the laser diode 33a.

In this case, when the high output pulse-like driving current is fed to the laser diode 33a, this laser diode 33a will produce a high output light beam and a pit will be formed in the track part on which this high output light beam is radiated. That is to say, user data will be recorded in the data part 15.

Figure 4:
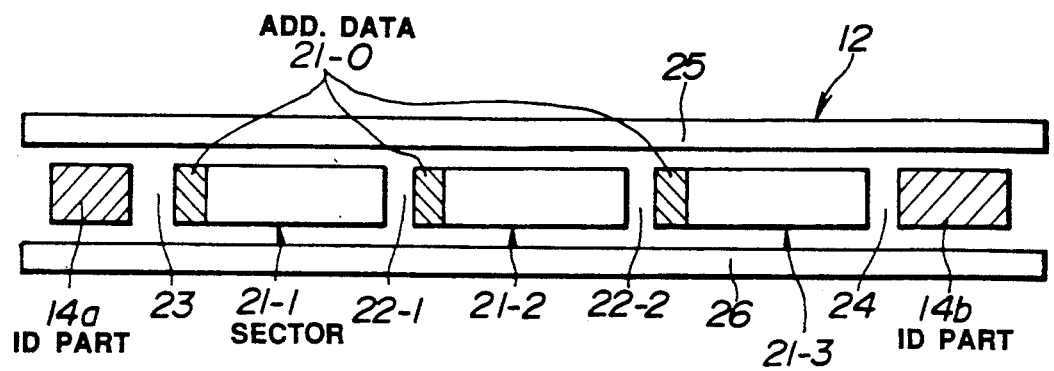

FIG. 4 shows as magnified the track 12 in FIG. 2 and shows an example of a format in the case of a formation of three sectors within one track and that additional information including secret infomation is recorded in each sector which is a data block. The same number as in FIG. 2 represents a component of the same function. 21-1, 21-2 and 21-3 represent sectors dividing the track 12 into a plurality of recording regions. 22-1 represents a gap between the sectors 21-1 and 21-2. 22-2 represents a gap between the sectors 21-2 and 21-3. 23 represents a gap between the ID part 14a and the sector 21-1. 24 represents a gap between the ID part 14b and the sector 21-3. 25 and 26 represent track guides for tracking. The gaps 23 and 24 are provided to absorb the speed fluctuation in the case of driving the optical card 11 at a fixed speed.

Figure 5:
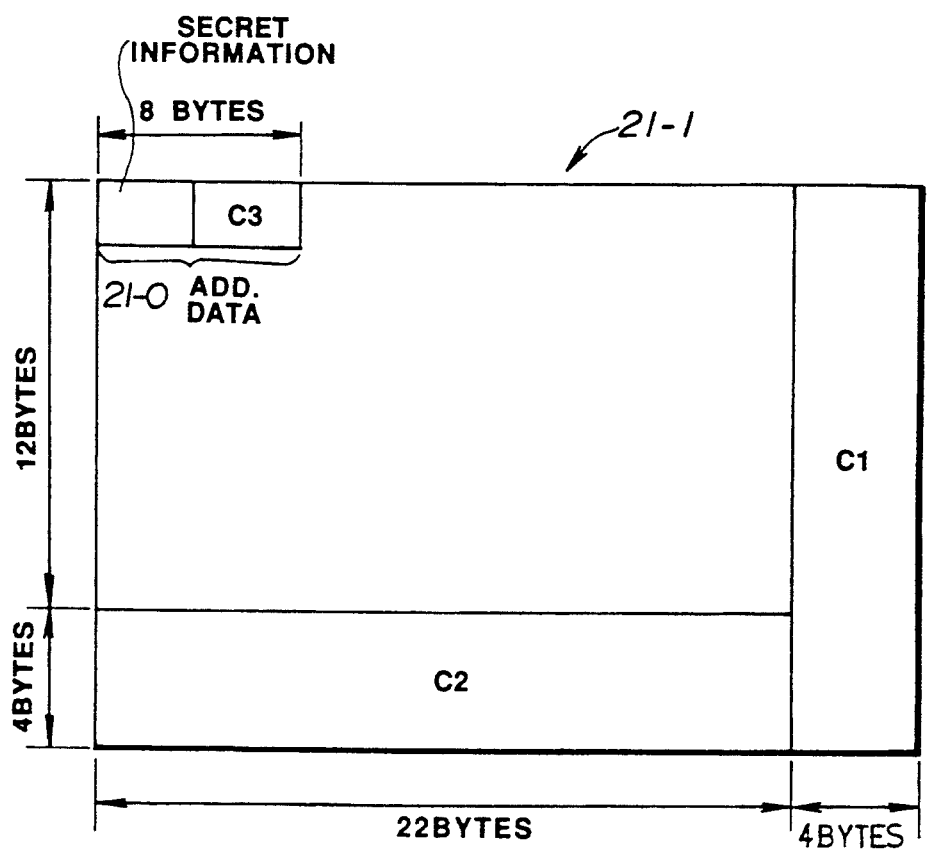

FIG. 5 shows the formation of user data recorded in each sector. Additional data 21-0, including secret information, are to be recorded in the top part of each sector. In this example, the formation of the data in one sector consists of the total of 264 bytes of the number of added data of 8 bytes including the secret information with the number of data of 256 bytes, the C2 codes made the (16, 12) RS codes by adding the error correcting Reed Solomon Codes (RS codes hereinafter) so as to be product codes and the C1 codes made the (26, 22) RS codes. At the time of recording in the optical card, the thus encoded data blocks will be successively read out of each byte in the line direction, will be converted to serial data and will be recorded within one sector. In the formation of the additional information data, the secret information number is of 4 bytes and the error correcting C3 code is of RS codes of (8,4).

Figure 6:
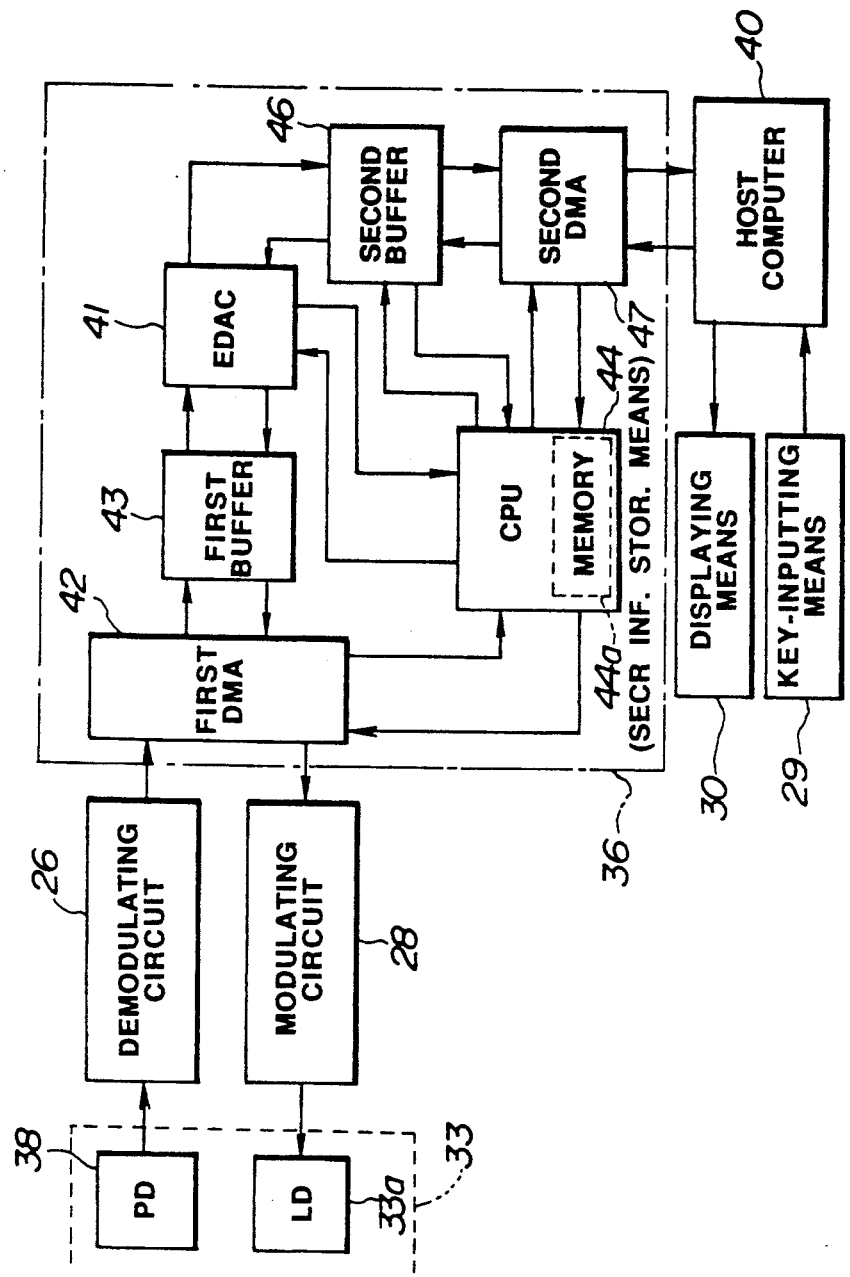

FIG. 6 shows the peripheral part of the controller 36 controlling the operation of reading/writing data from the optical card 11 within an optical card reading/writing apparatus. The output of the photodetector (PD) 33g within the optical head 33 arranged opposite the optical card 11 is input into the demodulating circuit 26, is demodulated in the byte unit as data before the error correction and is stored in a first buffer 43 temporarily storing data through a first Direct Memory Access, or DMA, circuit 42.

By this first DMA circuit 42, at the time of reading out (reproduction), the demodulated data will be transferred to the first buffer 43 without passing through a CPU 44 controlling the entire operation of this controller 36 and, at the time of writing (recording), the data stored in the first buffer 43 will be transferred to the modulating circuit 28. By this modulating Circuit 28, at the time of recording, the data transferred through the first DMA circuit 42 will be converted to serial written data and a modulating operation of making the laser diode 33a within the optical head 33 emit light in response to the written data will be made.

By the above mentioned first buffer 43, at the time of reading, the demodulated data transferred through the first DMA circuit 42 will be transferred to the EDAC circuit 41 which will detect and correct errors of the transferred data and, at the time of writing, by the EDAC circuit 41, the data (transmitted from the later described host computer 40) to which the error correcting codes are added will be transferred to the first DMA circuit 42 and the transferred data are transferred to the modulating circuit 28.

The data having had the errors corrected by the above mentioned EDAC circuit 41 are stored in the second buffer 46 and CPU 44 decides the permission or inhibition of transmission of the data stored in the second buffer 46 to host computer 40 through a second DMA circuit 47. At the time of reading out, it will be judged by the CPU 44 whether the data in the secret information area within the area stored in the second buffer 46 are data to be protected or not. In the case of data requiring no protection, the DMA function of the second DMA circuit 47 will be permitted. In the case of data requiring protection, at the time of reading, it will be judged whether the data coincide with the secret information data input by the key inputting means 29. Only in case they coincide, the DMA operation of the second DMA circuit 47 will be permitted. In case they do not coincide, the DMA operation will be inhibited.

Therefore, in case the DMA operation is permitted, the data will be transferred to the host computer 40 by the second DMA circuit 47. When these data are transferred, the host computer 40 will display data read out, for example, by the displaying means 30. On the other hand, in case the transfer by the second DMA circuit 47 is inhibited, the data will not be transferred to the host computer 40 side. In this case, the host computer 40 will display, for example, in the displaying means that the data reading is erroneous or that the input secret information is wrong so as to prevent the data to be kept secret from being carelessly read out.

By the CPU 44, the secret information data transferred through the second DMA circuit 47 from the host computer 40 (input by the key inputting means 29) are memorized in the memory 44a within this CPU 44 and it is thereby judged whether the secret information data coincide with the data (that is, the secret information number data) within the secret information area of the second buffer 46.

At the time of recording, the secret information data input by the key inputting means 29 will be once stored within this memory 44a and then will be stored in the position of the secret information area provided in advance within the second buffer 46 against the inherent data stored in the second buffer 46 through the second DMA circuit 47 from the host computer 40 and then the error correcting code will be added by the EDAC circuit 41.

The data to which this error correcting code has been added will be stored in the first buffer 43, the laser diode 33a will be controlled in the light emission through the first DMA circuit 42 and modulating circuit 28, the optical card 11 will be recorded with the secret information number attached and then the secret information number will be recorded, for example, in the top position of each sector.

As the above mentioned EDAC circuit 41 is encoded so as to doubly correct errors for the secret information number, even the secret information number alone is high in the reliability.

Figure 7:
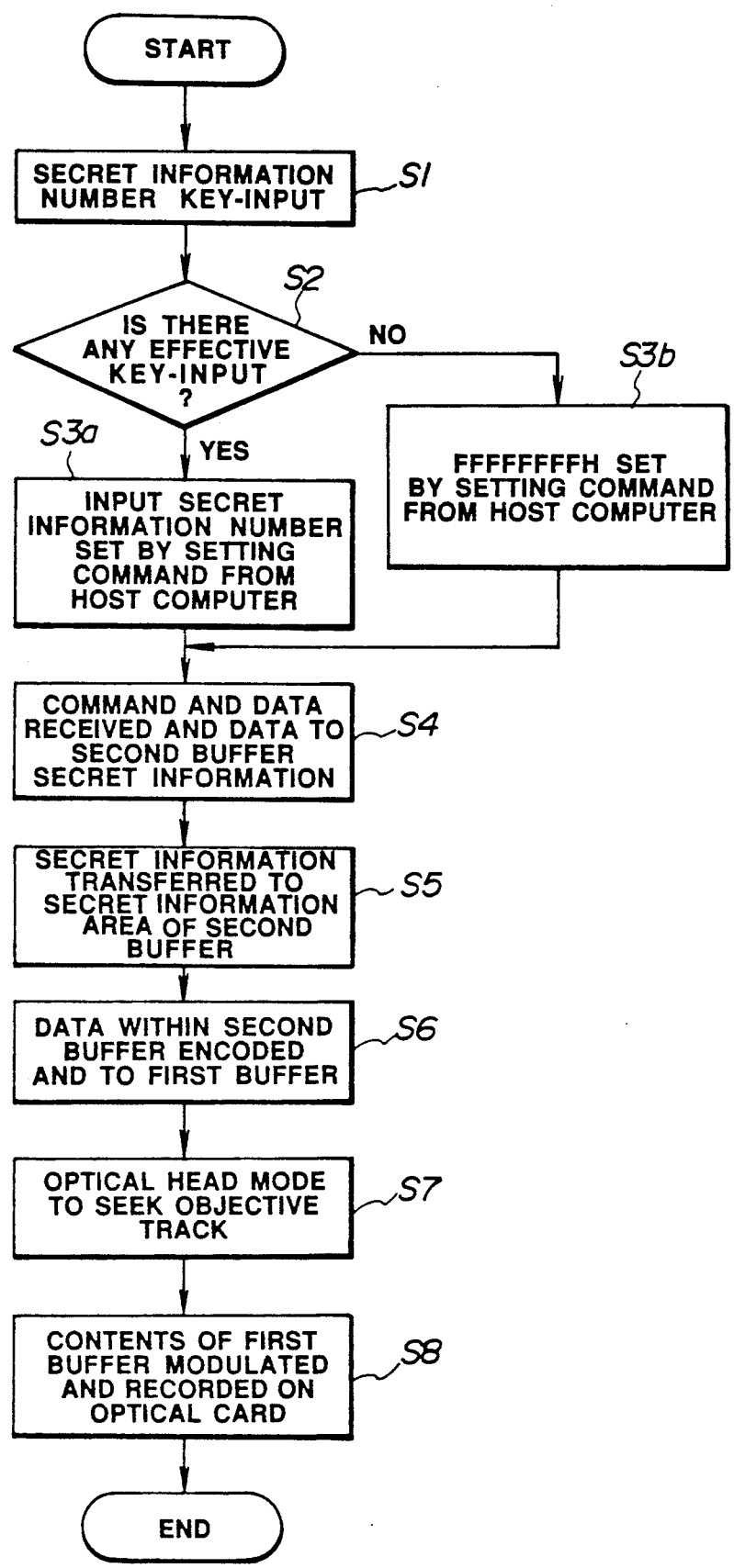

The operation of recording the secret information number added to the sector in the optical card 11 shall be explained in the following with reference to FIG. 7. When this recording operation starts, the secret information number will be key-input by the key-inputting means 29 in response to whether the data to be recorded are to be kept secret or not (step S1). That is to say, in case the data are to be prevented from being read out, for example, the secret information number provided in response to the optical card 11 in which these data are recorded will be input but, in case they are not, a key making the corresponding process will be selected or merely the return key will be pushed not to input the secret information number.

Then, the host computer 40 will judge whether there is an effective key-input or not (step S2). In case there is an effective key-input, as shown in step S3a, by a secret information setting command from this host computer 40, the secret information number will be set in the memory 44a as a secret information number storing means within the CPU 44. In case an effective key-input is not made, as shown in step S3b, by the setting command from the host computer 40, for example, FFFFFFFFH representing data not required to be kept secret (further, data of the same number of bytes as of the secret information number) will be set (H represents 16 progresses).

That is to say, in the case of no secret information number, predetermined data FFFFFFFFH of 4 bytes will be made. On the other hand, in the case of a secret information number, the other data of the same 4 bytes than FFFFFFFFH will be made.

When the setting of the data by the above mentioned step S3a or S3b ends, a command of recording next and data, for example, for one sector will be transferred to this controller 36 from the host computer 40 and data for one sector will be transferred to the second buffer 46 through the second DMA circuit 47 (step S4).

Then, by the CPU 44, the secret information number (FFFFFFFFH in the case of no effective secret information number) of 4 bytes received by the secret information command is transferred to the secret information area within the second buffer 46 (step S5). Then, the EDAC circuit 41 is started, an error correcting code is generated for the data (that is, the ordinary data to be recorded in the optical card 11 and the secret information number or non-secret information number representing whether the data should be protected or not) within the second buffer 46 and the result is stored within the first buffer 43 (step S6). In the case of storing the data in this first buffer 43, the entire data may be interleft (the arrangement of the recorded data is different from the case that such additional data as the secret information number are written into the top part of one sector as shown in FIG. 4).

Then, the optical head 33 is made to seek the track to be recorded (step S7). The data within the first buffer 43 are transferred to the modulating circuit 28 through the first DMA circuit 42. The data transmitted from this buffer 43 are modulated to data to be recorded on the optical card 11 by this modulating circuit 28, the light emission of the laser diode 33a is controlled and the data are recorded on the optical card (step S8). By repeatedly recording these data in each sector, the data are recorded as in FIG. 4 and the recording operation ends. In fact, after this recording, these data are reproduced and an operation of verifying whether the data recorded on the optical card 11 coincide with the data restored by the reproduction is often made.

Figure 8:
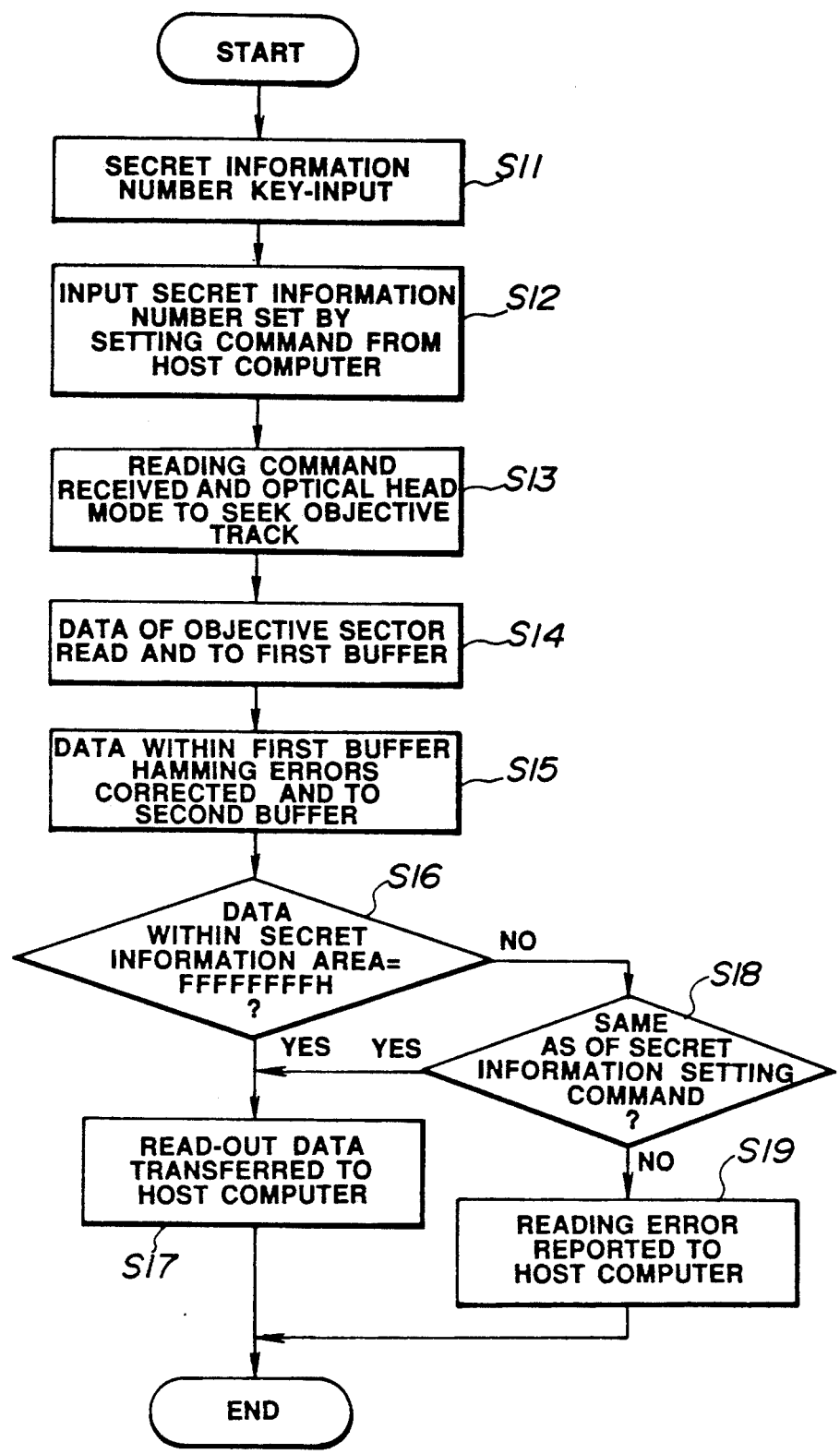

The reproducing operation of reading out the data recorded on the optical card 11 by such recording operation as is mentioned above shall be explained in the following with reference to FIG. 8.

The same as in the recording operation, first the secret information number is key-input by the key-inputting means 29 (step S11). By this key-input, the secret information number of 4 bytes sets in the memory 44a within the CPU 44 the secret information number input by the setting command from the host computer 40 (step S12). In order to read out the data, this secret information number must be the same as is set at the time of recording.

Then, by the CPU 44, the reading command from the host computer 40 is received and the optical head 33 is made to seek the objective track to be read out (step S13). The data read out of the optical card and detected by the photodetector 33g are demodulated by the demodulating circuit 26 and are stored in the first buffer 43 by the operation of the DMA circuit 42 (step S14). Then the data within the first buffer 43 have errors detected and corrected by the operation of the EDAC circuit 41 and the results are stored in the second buffer 46 (step S15). (In case the data are interleft at the time of the recording operation, they will be de-interleft here.) As a result, the data having had errors corrected and the secret information number are stored in the second buffer 46.

Then, by the CPU 44, the secret information number within the secret information area within the second buffer 46 is read out and it is judged whether this secret information is data not required to be protected.

That is to say, the CPU 44 judges whether this secret information number is FFFFFFFFH or not (step S16). If it is judged to be data not required to be protected, in the next step S17, the inherent data except the secret information number will be transferred to the host computer 40 (which will display the transferred data, for example, in the displaying means 30).

On the other hand, in case the judgment in the above mentioned step S16 is negative, it will be judged whether the secret information number is the same as the secret information data set in advance by the secret information setting command or not (step S18). In case it is judged that the data within the secret information area do not coincide with the secret information data set by the secret information set by the secret information setting command, the CPU 44 will report the data reading errors to the host computer 40 (step S19) and will be displayed as reading errors, for example, in the displaying means 30 to secure the protection of reading out the data.

On the other hand, in case it is judged in the above mentioned step S18 that the data within the secret information area coincide with the secret information data (set by the secret information setting command and) actually used for this optical card 11, the secret information number will be considered to be known and therefore the data will be transferred to the host computer 40 as shown in the step S17.

Thus, in case another person not knowing the secret information number tries to read out the data required to be protected, a maximum of $2^{32}$ trials will be required and it will be well-nigh impossible to read out the data by breaking the protection. Also, the data can be protected with a simple formation. Further, the data can be recorded or reproduced within a time shorter than in the case of protecting the data by encoding the data themselves (the processing time can be made shorter).

Here, the secret information is made data of 4 bytes but the error correcting code part to be added to the secret information may be included in the secret information to be 8 bytes long so that the security may be further elevated.

By the way, the secret information number may be set to be different in each optical card or one secret information number may be allotted to one user. Also, a track number or sector number may be included as a secret information number in one optical card or a different secret information number may be made for each track or sector (a part of the secret information data of 4 bytes may be allotted to a track number or sector number).

Figure 9A:
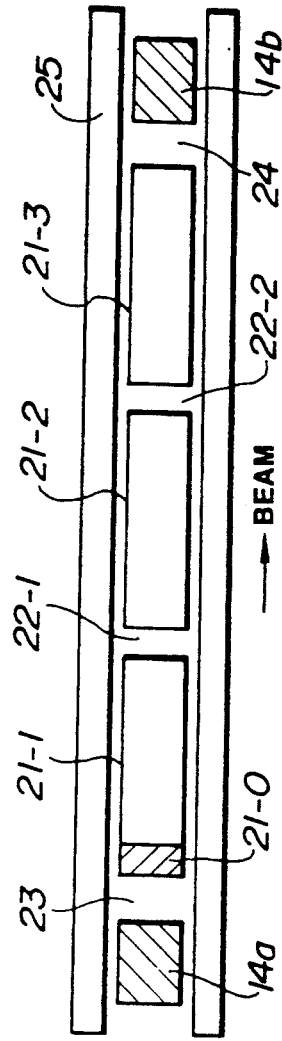
Figure 9B:
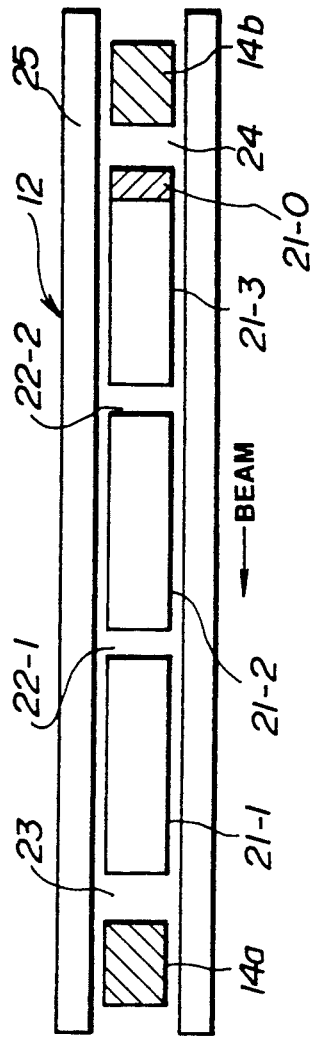

FIG. 9 shows a track in a modification of the first embodiment. In case the light beam scans in the direction from the left to the right as in FIG. 9a, after the ID part 14a, the additional information 21-0 will be recorded in the top part of the first read sector 21-1 but will not be recorded in the other sectors 21-2 and 21-3. In case the light beam scans in the direction from the right to the left as shown in FIG. 9b, after the ID part 14b, the additional information 21-0 will be recorded in the top part of the first read sector 21-3 but will not be recorded in the other sectors 21-2 and 21-1. That is to say, in the first embodiment, the additional information is recorded in each sector but, in this modification, the additional information is recorded in each track. Also, in case the reproduction is possible from either of the right and left, the additional information may be recorded only in the sectors (21-1, 21-3) at both ends.

As another modification, the additional information may be recorded at intervals of a plurality of tracks. Also, the additional information different in each track number or sector number may be recorded in each file of the recorded information. FIG. 10a shows that a different additional information is recorded in each file of the information to be recorded. That is to say, the additional information a1 is recorded in each of the sectors 21-1 to 21-4 recording the information of a file name of f1 and the additional information a2 is recorded in each of the sectors 21-5 to 21-7 recording the information of another file name of f2. By the way, as the track 12b adjacent to the track 12a is recorded or reproduced from the reverse direction, contrary to the case of the track 12a, the additional information is recorded on the ID part 14b side.

FIG. 10b shows that a different additional information ai is recorded in each sector 21-i (i=1, 2, ...). The different additional information ai in each sector 21-i is determined, for example, by adding an error correcting code C3 to the operation result determined by an operation rule (carried out, for example, by the CPU 44) set in advance by using the track number and sector number in which the data are to be recorded for one secret information number. Thus, the secrecy can be improved to be higher than in the case of adding the same additional information. Also, the recording user may select or set such operation rule that one secret information number as an initial value may become a different secret information number in each sector.

The second embodiment of the present invention shall be explained in the following.

In the first embodiment, in case the secret information number and operation result do not coincide with each other, the retrial will be able to be easily made by changing the secret information number or the cooperation result and therefore it will not be able to be said to be unlikely that the input key number will happen to coincide and the security will become null.

In the second embodiment is shown an example that the retrial can not be easily made.

The following two operating modes are prepared for the optical card recording and reproducing apparatus. First of all, for the first mode is prepared a mode of using no secret information number at the time of reading out data. In this mode, the command of setting the secret information number explained in the first embodiment can not be used (is made an illegal command) and, only when the secret information number is FFFFFFFFH, the data will be transferred to the host computer 40. Therefore, in case the secret information number is not FFFFFFFFH, so long as the data are in this mode, they will not be read out forever.

The second mode shall be a mode of using a secret information number at the time of reading out data. In this second mode, such treatment as is described in the first embodiment is made to protect the read data. In this mode, the secret information number setting command is effective. In this embodiment, when the mode setting command is input, the second mode will be set. When the mode setting command is not input, the first mode will be set.

That is to say, when the optical card 11 is fitted to make a reproducing operation, for example, a mode setting command from the key-inputting means 29 or data corresponding to it will be key-input into the host computer 40 and, by a controlling command judging whether this key-input corresponds to the mode setting command or not and determining the reproducing operation mode of the recording and reproducing apparatus, the setting of the two modes will be determined.

In case the key-input from the key-inputting means 29 is judged to correspond to the mode setting command, the controlling command transmitted to the CPU 44 from the host computer 40 will set the second mode. In case it is not judged to correspond to the mode setting command, the controlling command will set the first mode. Once in either mode, the operation will not be able to shift to any other mode until the power source of the apparatus is switched off.

By such formation, the keys of access to the user will be the two of the command determining the operating mode of the apparatus and the secret information number of the first embodiment so that a security higher than in the first embodiment may be secured.

Figure 11:
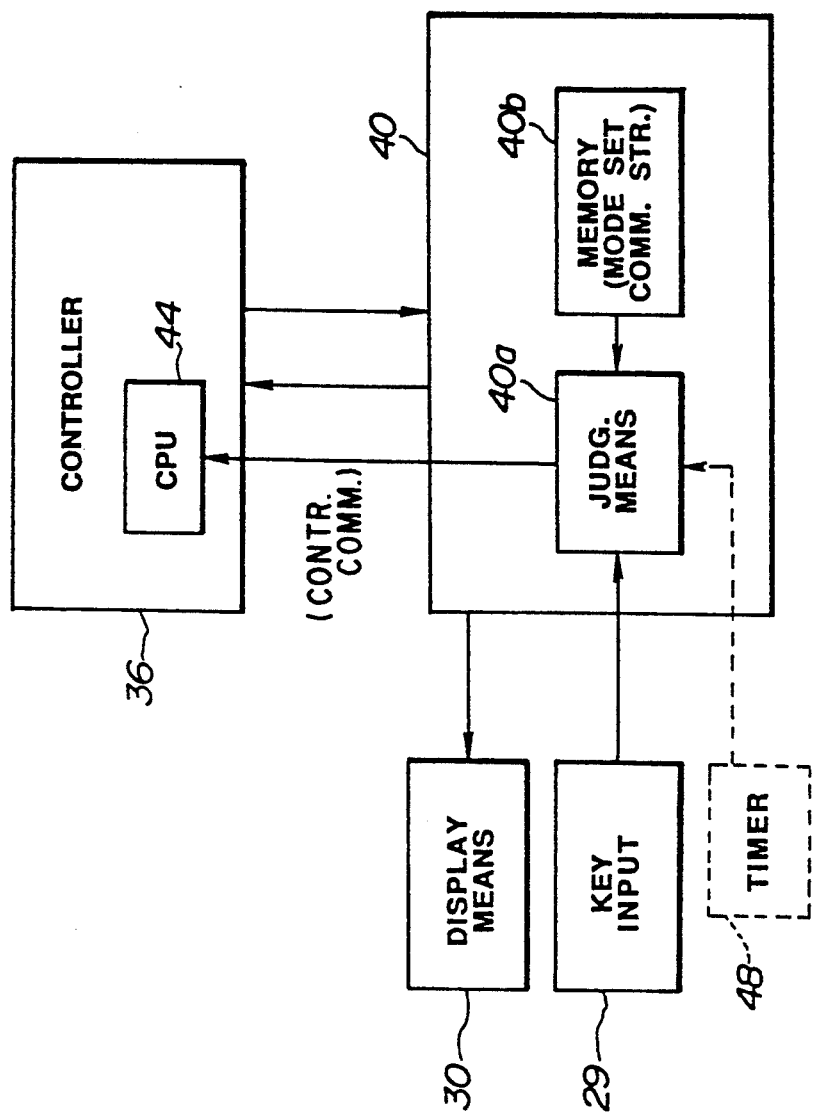
FIG. 11 is a block diagram showing the formation of a part of the second embodiment of the present invention.

A part of this second embodiment is shown in FIG. 11. The key-input data input from the key-inputting means 29 are input into the judging means 40a within the host computer 40 and are judged as to whether they coincide with the mode setting command stored in advance in the memory 40 as a mode setting command storing means. In case they are judged to coincide, a controlling command to operate in the second mode will be transmitted to the controller 36 (CPU 44) side. In case they are not judged to coincide, a controlling command to operate in the first mode will be transmitted to the controller 36 side.

By the way, in case the timer 48 is started as shown by the dotted lines in FIG. 11 from the key-input (judged by the host computer 40) starting the reproducing operation and the key-input corresponding to the correct mode setting command is not made within a fixed time, the operation may be forcibly made in the first mode.

Figure 12:
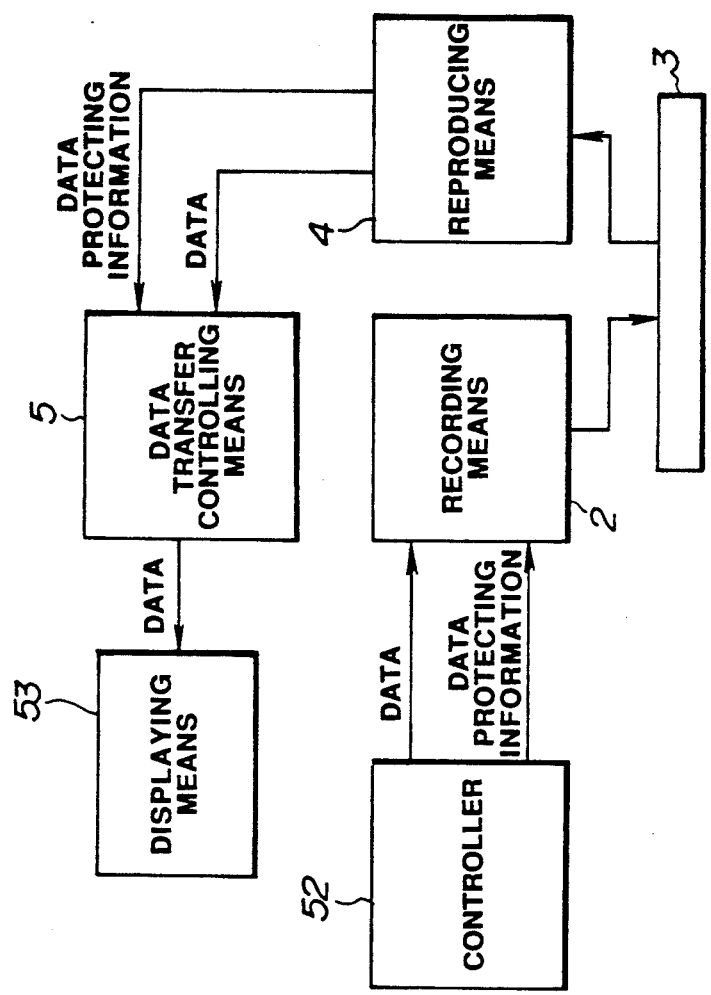
FIG. 12 is a conceptional formation diagram of the third embodiment of the present invention.

The third embodiment of the present invention shall be explained in the following. FIG. 12 shows the schematic formation of the optical card recording and reproducing apparatus of the third embodiment of the present invention. This recording and reproducing apparatus is of a standing alone type. That is to say, without the host computer 1 in FIG. 1, the data and data protecting information are transferred to the recording means 2 from the controller 52. The data transmission controlling means 5 controls whether the data are to be displayed in the displaying means 53 or not. The other formations are the same as in FIG. 1, shall bear the same reference numerals and shall not be explained here.

Figure 13:
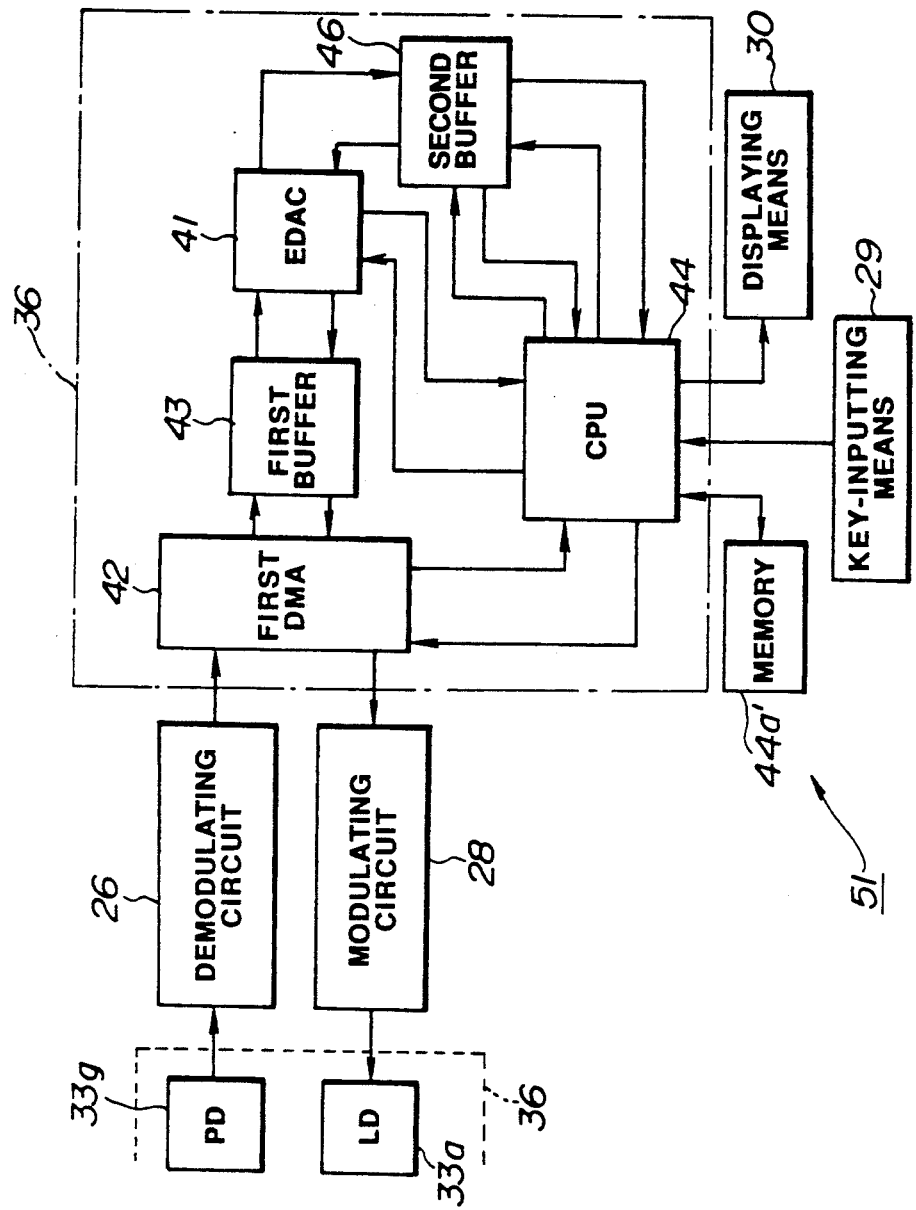
FIG. 13 is a block diagram showing a schematic formation of the third embodiment.

Now, the concrete formation shall be shown by using FIG. 13. This recording and reproducing apparatus 51 does not have the host computer 40 in the apparatus shown in FIG. 6. The second buffer 46 can transfer data with the CPU 44. Also, in this embodiment, the key-inputting means 29 and displaying means 30 are connected with the CPU 44 so that the secret information number input from the key-inputting means 29 may be memorized in the memory 44a' inside or outside the CPU 44 and may be judged as to whether it coincides with the secret information number within the secret information area of the second buffer 46 when read out of the optical card by the reproduction and the CPU may control whether it is to be displayed in the displaying means 30 according to the result of judgement.

That is to say, in the first embodiment, whether the data are to be transferred to the host computer 40 side or not is controlled in response to whether the secret information number input at the time of the reproduction coincides with the secret information data within the secret information area or not but, in this third embodiment, whether the data are to be displayed in the displaying means 30 or not is controlled and, only in case the input secret information number coincides with the secret information data, the data will be displayed in the displaying means 30 but otherwise the displaying will be inhibited to secure the protection of the data (in case the data are protected). The other formations are the same as are shown in FIG. 5 and the same components shall bear the same reference numerals and shall not be explained here.

The operation and effects of this third embodiment are substantially the same as of the first embodiment.

By the way, in case such data outputting means as a printer is provided together with the above mentioned displaying means 30, when the displaying in the displaying means 30 is inhibited, the data transfer to the data outputting means will be simultaneously inhibited.

By the way, for example, one secret information number is set in common with one optical card, such fixed operation as an addition, subtraction, multiplication or division is made with the track or sector number in which data are actually recorded together with the secret information number for the secret information number input at the time of recording and the secret information data (for example, only of the 4 bytes) of the operation result may be recorded actually by interleaves or the like together with the inherent data. In this case, a reverse operation will be made at the time of the reproduction and, in case the same secret information number as at the time of the recording is input, the same countermeasures will be able to be taken.

Thus, even if the inherent data part is tried to be read out of this optical card by using a general reproducing apparatus of a formation (or function) different from of the apparatus of the first embodiment, unless the operation rule is known, it will not be able to be read out and the secrecy will be able to be secured.

By the way, the secret information number to be recorded in the recording medium may be made, for example, without attaching the error correcting code, this secret information number may be read out within a fixed gate period at the time of the reproduction, it may be judged by a pattern or the like whether this secret information number coincides with the secret information number input at the time of the reproduction or not and, for example, the operation of reading out the data reproduced thereafter may be stopped or inhibited in response to the judged result.

By the way, an optical card has been explained in the above description but the present invention can be applied also to other recording media than the optical card. Also, a different embodiment can be formed by partly combining the above described respective embodiments.

As described above, according to the present invention, the data to be recorded in the recording medium and the additional data including the secret information data inhibiting the data from being carelessly read out are recorded so that, at the time of the reproduction, only in case the input secret information data coincide with or correspond to the recorded secret information data, the data will be permitted to be read out and therefore the protection of the data can be secured with a simple formation.

What is claimed is:

1. An optical card recording and reproducing apparatus comprising:
   a card-like recording medium having a plurality of linear tracks on which are formed respectively an ID part in which discriminating information is recorded and a part which is discriminated by said discriminating information and in which user information is recorded/reproduced;
   a recording means for recording protecting information including a secret information data for inhibiting the reproduction of said user information except said protecting information recorded in each of a plurality of data sectors dividing the data part of the linear tracks of said card-like recording medium;
   a reproducing means for reproducing said user information recorded in said card-like recording medium and said protecting information;
   a secret information data inputting means for inputting said secret information data;
   a judging means for judging whether or not the secret information data input by said secret information data inputting means and the secret information data reproduced by said reproducing means coincide with each other; and
   an inhibiting means inhibiting the function of either displaying or transferring the reproduced user information reproduced by said reproducing means in case said judging means does not judge that the input secret information data and the reproduced secret information data coincide with each other.

2. An optical card recording and reproducing apparatus according to claim 1 wherein, in the case of recording said information in said card-like recording medium, said recording means records said protecting information including said secret information data input from said secret information data inputting means into said data sector in which said user information is recorded.

3. An optical card recording and reproducing apparatus according to claim 2 wherein said recording means records said protecting information in the top part of said data sector.

4. An optical card recording and reproducing apparatus according to claim 1 wherein, in the case of reproducing said user information recorded in said card-like recording medium said judging means judges whether or not the secret information data input from said secret information data inputting means and the secret information data reproduced by said reproducing means coincide with each other.

5. An optical card recording and reproducing apparatus according to claim 1 further comprising a host computer controlling the operation of said recording and reproducing apparatus and wherein, in case said judging means does not judge that the input secret information data and the reproduced secret information data coincide with each other, said inhibiting means will inhibit the function of transferring the user information reproduced by said reproducing means to said host computer.

6. An optical card recording and reproducing apparatus according to claim 1 further comprising a displaying means for displaying the user information reproduced by said reproducing means.

7. An optical card recording and reproducing apparatus according to claim 6 wherein, in case said judging means does not judge that the input secret information data and the reproduced secret information data coincide with each other, said inhibiting means will inhibit the function of said displaying means displaying the user information reproduced by said reproducing means.

8. An optical card recording and reproducing apparatus according to claim 6 wherein, in case said judging means does not judge that the input secret information data and the reproduced secret information data coincide with each other, said inhibiting means will inhibit the function of transferring to said displaying means side the user information reproduced by said reproducing means.

9. An optical card recording and reproducing apparatus according to claim 1 wherein said recording means and said reproducing means are formed of an optical head provided with a light beam means for generating light beams, an optical system condensing said light beams and radiating them to said card-like recording medium and a photodetector receiving through said optical system the light reflected by said card-like recording medium.

10. An optical card recording and reproducing apparatus according to claim 1 further comprising a mode setting controlling means operated by the first mode not receiving the input secret information data which is input from said secret information data inputting means and the second mode receiving said input.

11. An optical card recording and reproducing apparatus according to claim 10 wherein said mode setting controlling means will forcibly set said first mode unless a preset command is input.

12. An optical card recording and reproducing apparatus according to claim 11 wherein said mode setting controlling means will maintain said first mode state until the power source of said recording and reproducing apparatus is switched off in case it is set in said first mode.

13. An optical card recording and reproducing apparatus according to claim 10 wherein said mode setting controlling means will be set in said first mode not receiving the input secret information data which is input from said secret information data imputing means unless a preset command is input within a fixed time after the reproducing operation is started.

14. An optical card recording and reproducing apparatus according to claim 1 wherein said recording means records said protecting information in each said track.

15. An optical card recording and reproducing apparatus according to claim 1 wherein said recording means records said protecting information in each said data sector dividing each said linear track.

16. An optical card recording and reproducing apparatus according to claim 1 wherein said recording means can record protecting information different from each other in each said data sector.

17. An optical card recording and reproducing apparatus according to claim 16 wherein said protecting information recorded in each said data sector is set by an operation rule using the discriminating information of said data sector.

18. An optical card recording and reproducing apparatus according to claim 1 wherein said judging means and said inhibiting means are included in a CPU.

19. A recording and reproducing apparatus comprising:
- a recording medium having a plurality of tracks on which are formed respectively an ID part in which discriminating information is recorded and a part which is discriminated by said discriminating information and in which user information is recorded/reproduced;
- a recording means for recording protecting information including secret information data for inhibiting the reproduction of said user information except said protecting information recorded in each of a plurality of data sectors dividing the data part of said recording medium;
- a reproducing means for reproducing said user information and protecting information recorded in said recording medium;
- a secret information data inputting means for inputting said secret information data;
- a judging means for judging whether or not the secret information data input by said secret information data inputting means and the secret information data reproduced by said reproducing means coincide with each other; and
- an inhibiting means inhibiting the function of either displaying or transferring the reproduced user information reproduced by said reproducing means in case said judging means does not judge that the reproduced secret information data and the input secret information data coincide with each other.

* * * * *

UNITED STATES PATENT AND TRADEMARK OFFICE
CERTIFICATE OF CORRECTION

PATENT NO.: 5,311,498
DATED    : May 10, 1994
INVENTORS : HORIGUCHI, Toshio

It is certified that error appears in the above-identified patent and that said Letters Patent is hereby corrected as shown below:

Cover page, Item [21], "Appl. No. 811,466" should read --Appl. No. 841,466--.

Signed and Sealed this

Eighteenth Day of October, 1994

Attest:

BRUCE LEHMAN

*Attesting Officer*  *Commissioner of Patents and Trademarks*